(12) United States Patent
Diggle, III et al.

(10) Patent No.: US 6,969,039 B1
(45) Date of Patent: Nov. 29, 2005

(54) DRIVING DEVICE FOR SUPPORT DEVICE (75) Inventors: Frederick James Diggle, III, Birmingham, AL (US); Knox Lamar Faulkner, Sterrett, AL (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 0 days.

(21) Appl. No.: 10/646,204

(22) Filed: Aug. 22, 2003

(51) Int. Cl.[7] ............................................. F16M 13/00
(52) U.S. Cl. ..................... 248/546; 248/71; 248/216.1; 411/480; 411/485
(58) Field of Search ...................... 411/480, 481, 498, 411/485–487, 441, 923, 473, 474, 454, 456; 248/216.1, 216.4, 217.3, 217.4, 546, 547, 248/71, 121; 227/147, 9, 31, 119, 124; 81/44, 81/451

(56) References Cited

U.S. PATENT DOCUMENTS

| | | | | |
|---|---|---|---|---|
| 83,913 A | * | 11/1868 | Bradley | ....................... 411/480 |
| RE9,440 E | * | 11/1880 | Judd | ........................... 411/480 |
| 279,113 A | * | 6/1883 | Clow | .......................... 411/485 |
| 304,618 A | * | 9/1884 | Cullen | ........................... 81/23 |
| 306,874 A | * | 10/1884 | Thatcher | ..................... 296/122 |
| 415,181 A | * | 11/1889 | Wilcox | ........................ 411/480 |
| 543,121 A | | 7/1895 | Bates | |
| 601,849 A | | 4/1898 | Aiken | |
| 682,753 A | * | 9/1901 | Teele | ........................... 411/452 |
| 975,235 A | * | 11/1910 | Hansen | ........................ 411/476 |
| 1,313,795 A | * | 8/1919 | Davis | .......................... 411/456 |
| 1,779,339 A | * | 10/1930 | Sokoloff | ...................... 81/452 |
| 1,798,468 A | * | 3/1931 | Hartzler et al. | ............... 52/698 |
| 2,188,084 A | * | 1/1940 | Kuckuck | .................... 411/486 |
| 2,257,640 A | * | 9/1941 | Muller | ........................ 238/366 |
| 2,307,348 A | * | 1/1943 | Anderson | .................... 411/487 |
| 2,697,857 A | * | 12/1954 | Eckel | ....................... 52/506.05 |
| 3,061,835 A | * | 11/1962 | Hain | .......................... 227/147 |
| 3,088,361 A | * | 5/1963 | Hallock | .................... 411/372.5 |
| 3,178,971 A | * | 4/1965 | Bachli et al. | .................. 81/125 |
| 3,341,651 A | * | 9/1967 | Odegaard | .................... 174/159 |
| 3,483,790 A | * | 12/1969 | Matthews | .................... 411/481 |
| 3,848,080 A | * | 11/1974 | Schmidt | ...................... 174/164 |
| 3,934,802 A | * | 1/1976 | Jennings | ....................... 248/71 |
| 4,018,023 A | * | 4/1977 | Anderson | .................... 52/410 |
| 4,068,790 A | | 1/1978 | Osterle et al. | |
| 4,157,001 A | * | 6/1979 | Pickles | .................... 52/506.02 |
| 4,289,058 A | * | 9/1981 | Paskert | ....................... 411/456 |
| 4,438,769 A | * | 3/1984 | Pratt et al. | ............... 227/175.1 |
| 4,449,612 A | | 5/1984 | Southard | |
| 4,655,423 A | * | 4/1987 | Schavilje et al. | ............. 248/71 |
| 5,279,388 A | | 1/1994 | Laughlin et al. | |
| 5,513,935 A | * | 5/1996 | Sharber et al. | ............. 411/480 |
| 5,549,234 A | * | 8/1996 | Hong | ......................... 227/119 |
| 5,606,832 A | * | 3/1997 | Keith et al. | .................... 52/410 |
| 5,624,007 A | | 4/1997 | Mahaffy | |
| 5,881,837 A | | 3/1999 | Leicht | |
| 5,887,677 A | | 3/1999 | Malmgren | |
| 5,967,475 A | | 10/1999 | Johnson | |
| 6,585,142 B1 | | 7/2003 | Chen | |

(Continued)

Primary Examiner—Korie Chan
(74) Attorney, Agent, or Firm—Withers & Keys, LLC (57) ABSTRACT

A driving device for driving a support device into an object. The driving device includes a driving end adapted to receive a blow from a driving tool and an extension portion extending from the driving end, the extended portion adapted to contact a shank of the support device. The driving device also includes a nesting portion extending from the driving end, the nesting portion adapted to engage a split portion of the support device.

10 Claims, 7 Drawing Sheets

U.S. PATENT DOCUMENTS

| | | |
|---|---|---|
| 6,729,437 B1 | 5/2004 | Apple |
| 2002/0098062 A1 * | 7/2002 | Beale et al. ................ 411/454 |
| 2003/0140739 A1 | 7/2003 | McKivigan |
| 2004/0064932 A1 | 4/2004 | Sprague |
| 2004/0099300 A1 | 5/2004 | Warren |
| 2004/0129496 A1 | 7/2004 | Clark |

* cited by examiner

DRIVING DEVICE FOR SUPPORT DEVICE

BACKGROUND

The invention, in various embodiments, relates generally to devices and methods for their manufacture and use in working on, for example, utility poles.

In the telecommunications or electronics industry, it is common practice for a technician (also referred to as a "linesman") to scale a utility pole. The technician scales the utility pole to install equipment, to repair broken or damaged communications equipment, to test equipment, and/or for other work-related reasons. To safely and effectively scale a pole and perform line work, the technician must maintain and properly utilize various types of scaling and safety equipment. To utilize the various types of scaling and safety equipment, the technician must also have the skills and the physical ability to sustain a great strain on their legs and back while the technician climbs and/or maintains a position about the pole.

Conventional climbing equipment employed by a technician typically includes a pair of gaffs, a body belt, and/or a safety strap. In general, the gaff is a sharp blade protruding from the inside of the foot about mid-foot level and having straps that secure about the leg and/or feet of a technician. To climb, the technician drives one of the gaffs into the pole, steps up onto the gaff, and then drives the other gaff into the pole at a higher position. The technician continues taking steps up or "gaffs up" the pole until reaching a desired height.

The body belt is secured around the waist of the technician. The body belt includes pockets for carrying tools and rings (e.g., "D-rings") for attaching the safety strap. The safety strap typically includes a hook (e.g., snap buckle) at each end and a buckle for adjusting its length. During climbing, both hooks of the safety strap are attached to the same ring of the body belt on the left hip. Once in a position to perform line work, the technician releases one end of the safety strap from the body belt. The technician then wraps the safety strap around the pole and reattaches the end of the safety strap to the body belt, thus allowing the technician to use his hands at the desired working elevation. Thus, the technician uses the safety strap for climbing as well as supporting the technician in his working position about the pole.

During elevated line work, both gaffs are pressed into the pole and the technician leans back against the safety strap. This position allows the weight of the technician to be supported by the gaffs and the tension in the safety strap.

It can be appreciated that commercial entities and other organizations that employ workers in elevated environments are aware of the potential risks attendant upon work performed in such environments. In view of this awareness, commercial entities and other organizations devote time and resources to promoting the safety of workers performing work in elevated environments to make the performance of work as safe as possible. Promoting safety of workers in elevated environments may involve instituting training programs and/or providing workers with a variety of support devices, support systems, backup devices and systems, and/or other means that promote the stability and safety of workers in elevated environments. Despite the best efforts of an organization to enhance the safety of its workers and reduce the risk of falling from elevated structures, for example, it is nonetheless difficult to eliminate all risks to workers performing work on such elevated structures.

Redundant systems for promoting safety of workers on elevated utility structures may thus sometimes be used. Such redundant systems can sometimes be beneficial in addition to the myriad of existing support systems, methods, devices and/or other apparatus employed by workers on elevated structures to reduce or mitigate risks associated with falling from utility structures, for example.

SUMMARY

In various embodiments, the present invention is directed to a driving device for driving a support device into an object is described. The driving device includes a driving end adapted to receive a blow from a driving tool and an extension portion extending from the driving end, the extended portion adapted to contact a shank of the support device. The driving device also includes a nesting portion extending from the driving end, the nesting portion adapted to engage a split portion of the support device.

In various embodiments, the present invention is directed to a support device. The support device includes a rigid shank having a first end and a second end, threads disposed at the first end of the shank for use in securing the device to a pole, and a rigid first support member disposed on the second end of the shank for securing a first object to the pole. The support device also includes a rigid second support member disposed on the second end of the shank for securing a second object to the pole and a driving device attached to the second end of the shank and adapted to drive the support device into an object. The driving device includes a driving end adapted to receive a blow from a driving tool, an extension portion extending from the driving end, the extended portion adapted to contact a shank of the support device, and a nesting portion extending from the driving end, the nesting portion adapted to engage a split portion of the support device.

In various embodiments, the present invention is directed to a driving device for driving a support device into an object. The driving device includes receiving means adapted to receive a blow from a driving tool, extension means extending from the receiving means, the extension means adapted to contact a shank of the support device, and nesting means extending from the receiving means, the nesting means adapted to engage a split portion of the support device.

DESCRIPTION

U.S. application Ser. No. 10/643,177 filed Aug. 18, 2003 entitled "Support Device," which is incorporated herein by reference, discloses a support device that is manufactured, in one embodiment, by adding support members to a shank or casting an entire device in the desired shape. Various embodiments of the present invention permit ordinary steel or alloyed rod stock to be used in creating the support device, thereby potentially reducing manufacturing costs while producing an effective support device.

Figures 1, 2:
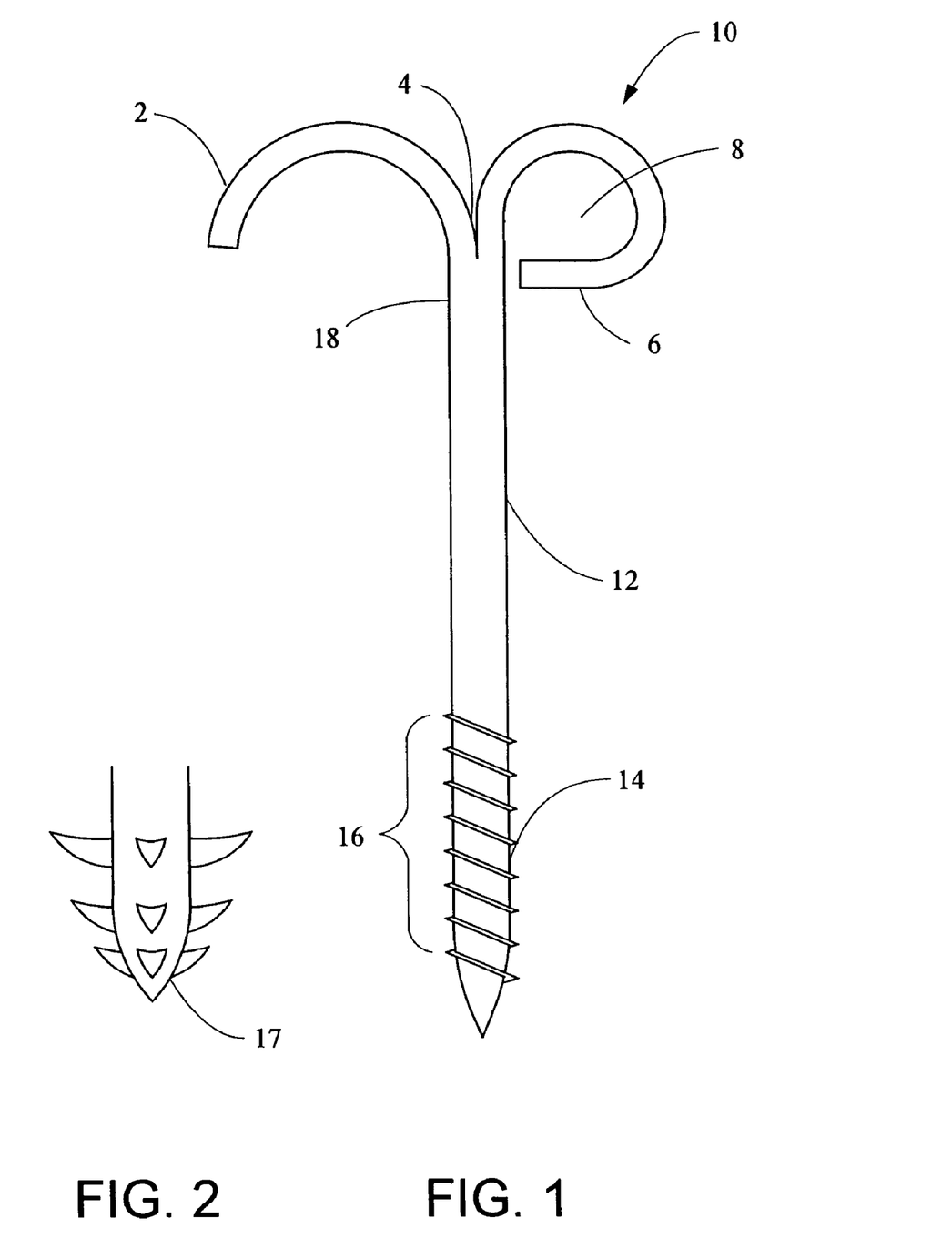
FIGS. 1–4 are schematics showing various embodiments of a support device.
Figure 3:
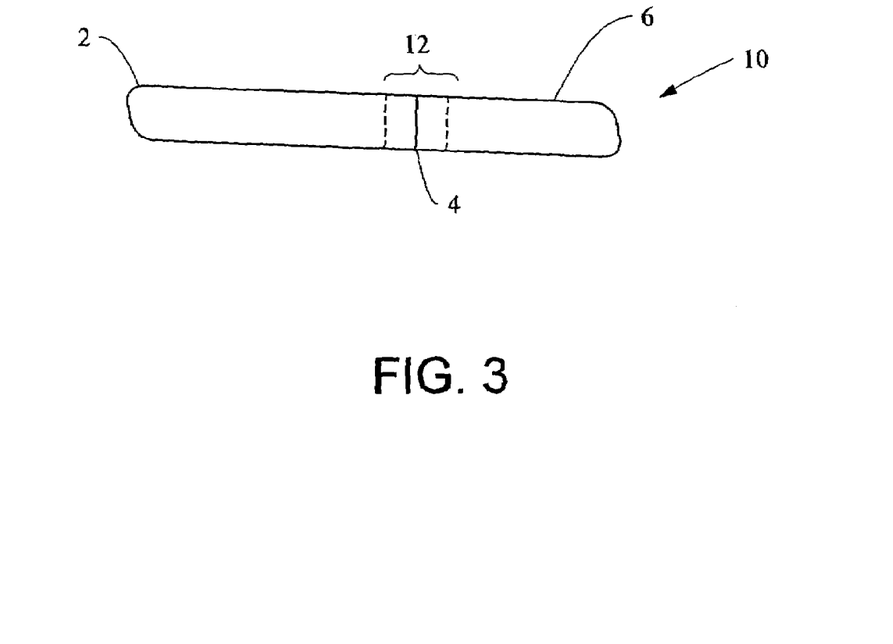
Figure 4:
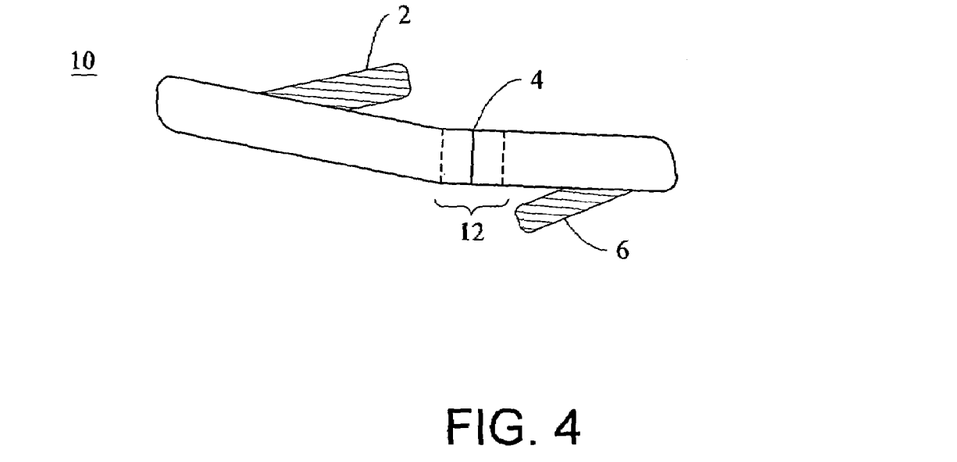

FIG. 1 illustrates an embodiment of a support device 10. The support device 10 has a shank 12 that has a first end 14 and a second end 18. A first support member 2 and a second support member 6 extend outwardly from the shank 12. The shank 12, first support member 2 and second support member 6, in one embodiment, have a co-planar relationship as depicted in FIG. 3. The shank 12, first support member 2 and second support member 6 may alternatively have a non-planar relationship as depicted in FIG. 4. The first end 14 of the shank 12 may have a threaded portion 16 for securing the shank into a utility pole, tree trunk, wall, rock face or any other vertical or columnar object, member or structure capable of receiving a support device as described herein. It can be appreciated that the threads 14 may be replaced with any securing means to retain the shank in a utility pole or structure, such as barbs or teeth 17 disposed about the first end 14 as illustrated in FIG. 2.

Figure 5:
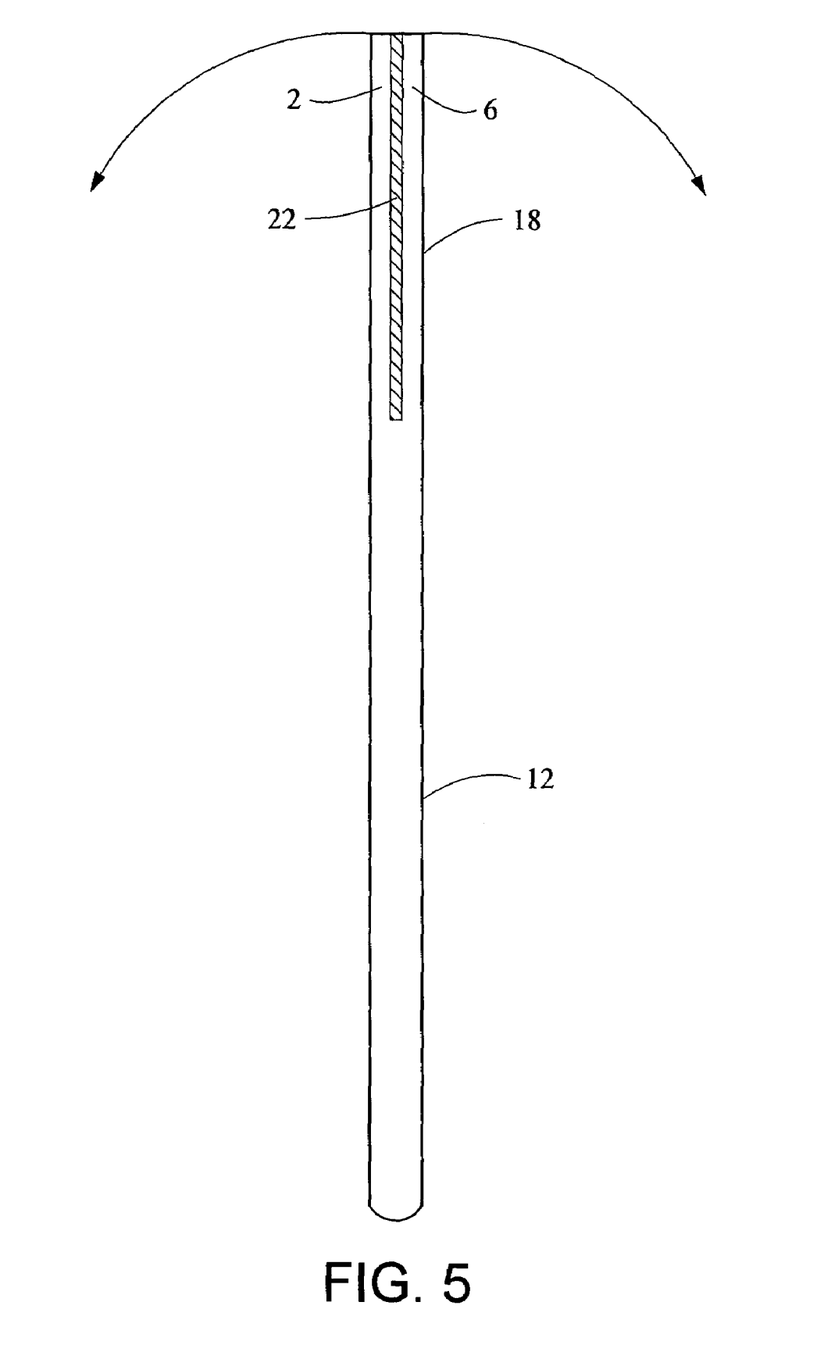
FIG. 5 is a schematic showing rod stock after splitting but before bending.

The support members 2 and 6 described above may be formed, in one embodiment, by splitting the second end 18 of the shank 12 by any means suitable for splitting a metal or alloy. These may include, for example, punching a section 22 out of the end 18, as depicted in FIG. 5, and then bending support members 2 and 6 into the desired shape by any means known in the metal working art. In another example, the support members 2 and 6 may be formed by cutting the end 18 into two sections by, for example, a bandsaw specially adapted for cutting metals or any other means known in the metalworking art.

After forming the support members 2 and 6, it may be necessary to apply metallurgical techniques to the support device 10 to achieve the desired strength and rigidity. In one example, the fully formed support device 10 may be stress-relief annealed to improve its metallurgical qualities.

Figure 6:
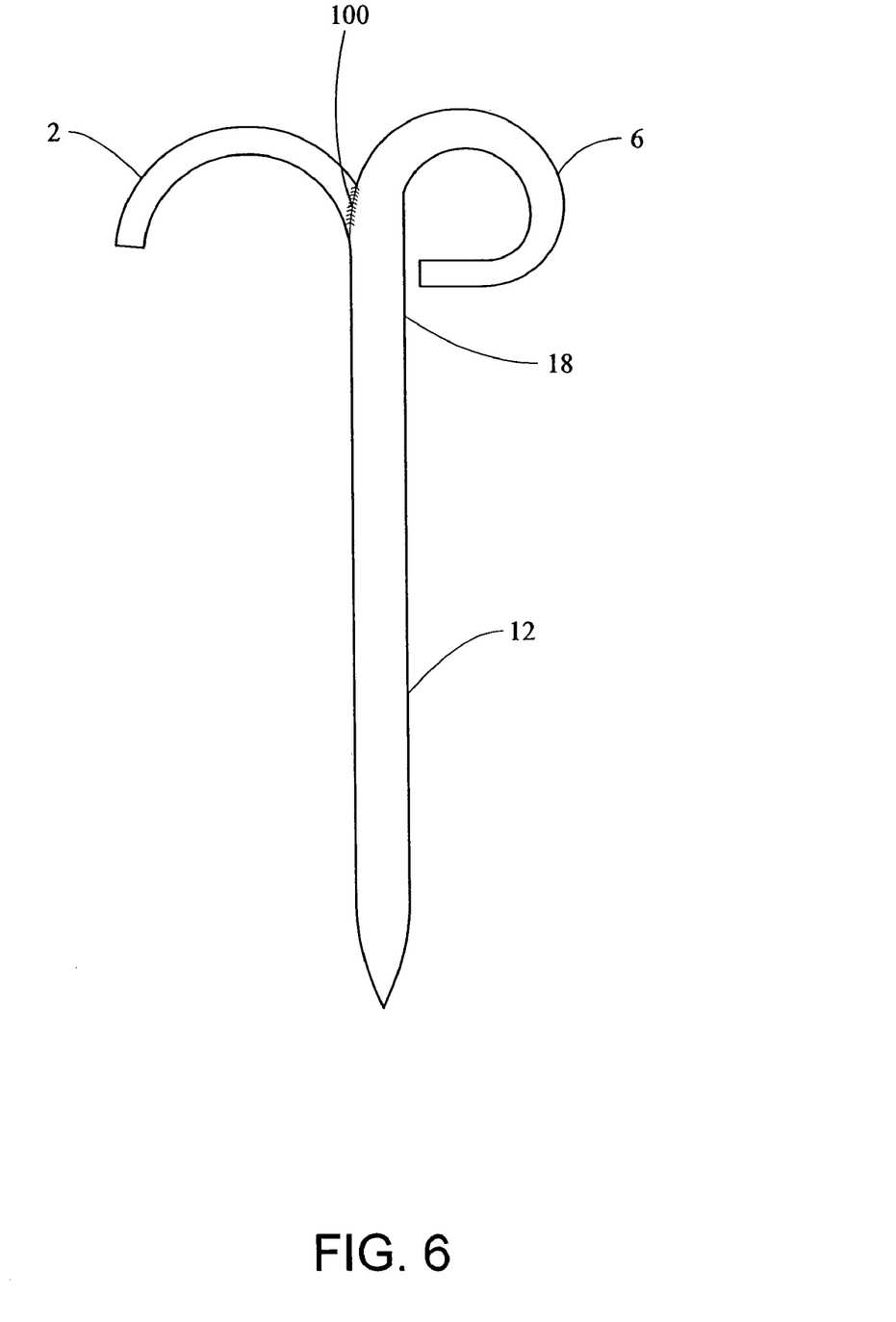
FIG. 6 illustrates an embodiment of a support device.

FIG. 6 depicts another embodiment of the support device 10. In this embodiment, support member 6 is formed by bending the second end 18 of shank 12 into the desired shape creating a single support member 6. A second support member 2 is then attached to the second end of the shank, in one embodiment, via a spot-weld 100. It can be appreciated that the second support member may be attached via any means known to those skilled in the metalworking art, including, for example, a mechanical attachment.

Materials for the shank disclosed herein may include, where appropriate and suitable for the reasonably safe and functional practice of the various embodiments described herein, one or more of the following materials: metals such as steel, aluminum, for example, titanium and/or stainless steel or any other metal or alloy capable of withstanding stress and strain. It can be appreciated that the choice of materials for construction of the various structural elements disclosed herein may be driven, at least in part, by the motivation to create an apparatus that is relatively light-weight, relatively compact and structurally sound and suitable for supporting items as intended during use of such an apparatus.

Figure 7:
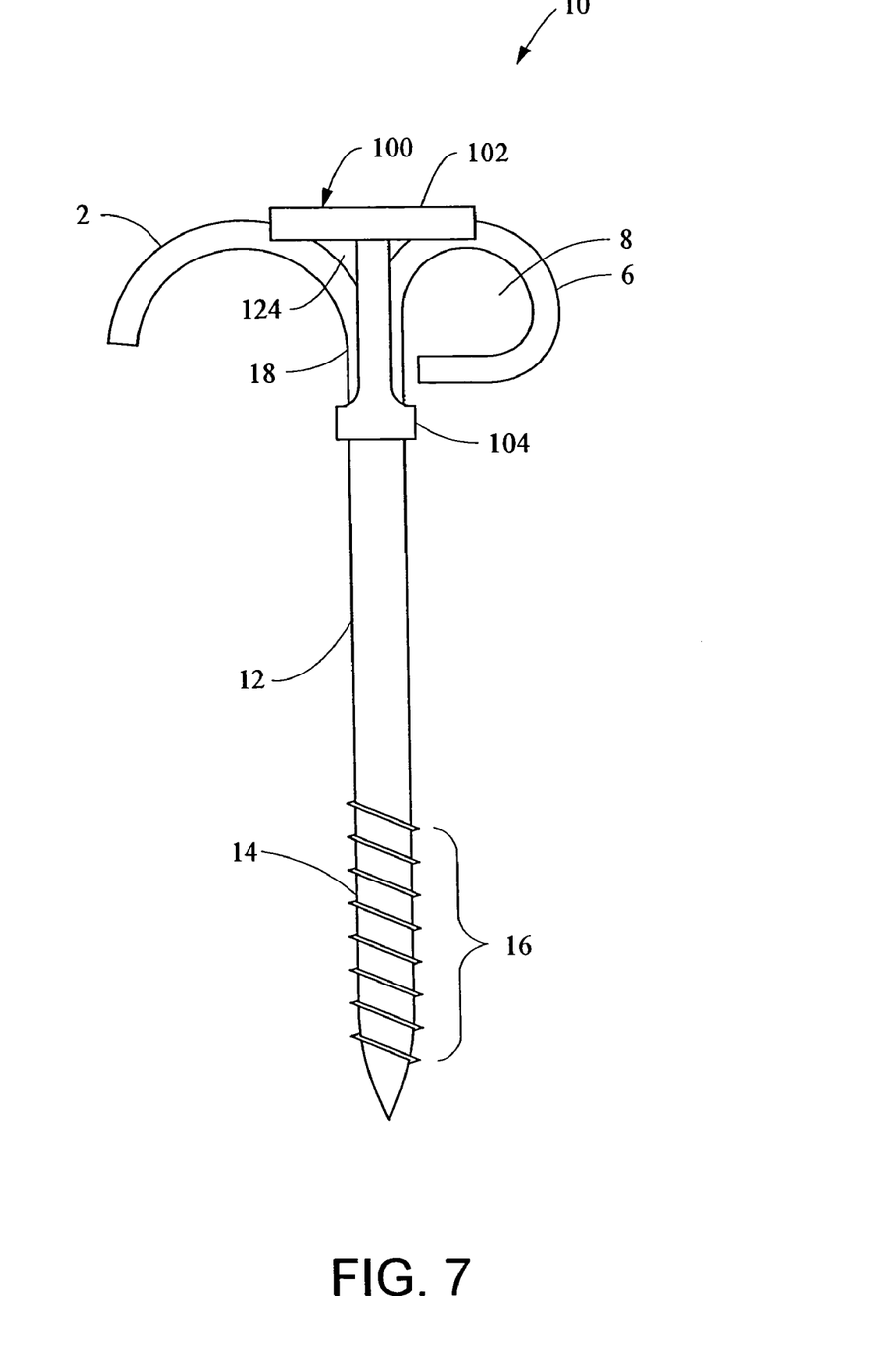
FIG. 7 illustrates an embodiment of the support device having a driving device 100 attached thereto.

FIG. 7 illustrates an embodiment of the support device 10 having a driving device 100 attached thereto. The driving device 100 includes a driving end 102 and an extension portion 104. The driving end 102 may be shaped to receive, for example, blows from a tool such as a hammer so that the support device 10 may be driven into, for example, a utility pole, tree trunk, a wall, a rock face, or any other vertical or columnar object, member, or structure. The extension portion 104 may be shaped to grip the shank 12 of the support device 10 such that when the support device 10 is driven into an object, the extension portion 104 helps to keep the driving device 100 secured to the shank 12 of the support device 10.

The driving device 100 may be constructed of any durable material such as, for example, metals such as steel, aluminum, titanium and/or stainless steel or any other metal or alloy capable of withstanding the stress and strain as described herein. The driving device 100 may be, in various embodiments, attached to the support device 10 using, for example, any type of adhesive or weld. The driving device 100 may be, in various embodiments, removable from the support device 10 such that the driving device 100 may be used to drive multiple support devices 10 into an object.

Figure 8:
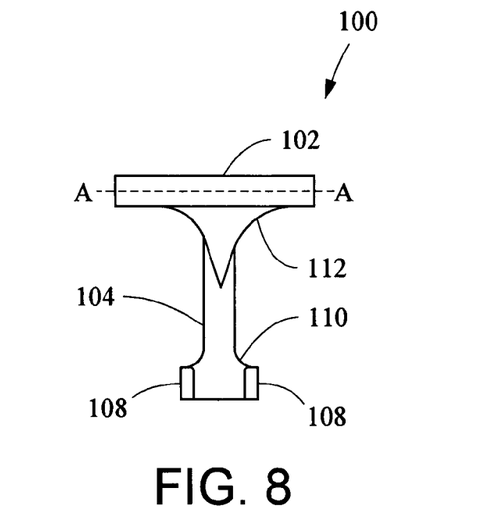
FIG. 8 illustrates a front view of an embodiment of a driving device.

FIG. 8 illustrates a front view of an embodiment of the driving device 100. A lower end 110 of the extension portion 104 may include, for example, snap portions 108 that may snap, or fit, onto the shank 12 of the support device 10. The snap portions may be, for example, tabs that are formed in or attached to the lower portion 110 or may be, for example, formed by bending the lower portion 110 into a "U" shape. The snap portions 108 may thus operate to provide a more stable attachment of the driving device 100 onto the support device 10 during, for example, the time when the support device 10 is being driven into an object.

As shown in FIG. 8, the driving device 100 may include a nesting portion 112 that fits into or nests in a split portion 124 of the support device 10. As shown in FIG. 8, the nesting portion 112 may be shaped such that it conforms to the shape of the split portion 124 to provide a substantially stable fit between the driving device 100 and the support device 10.

Figure 9:
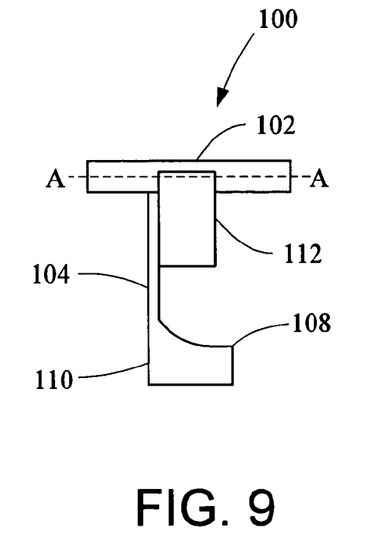
FIG. 9 illustrates a side view of an embodiment of the driving device.
Figure 10:
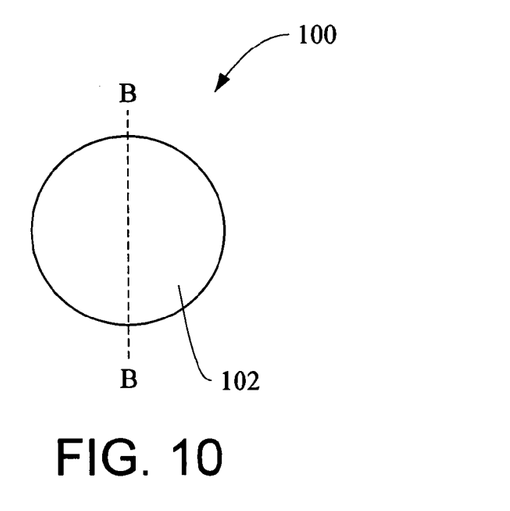
FIG. 10 illustrates a top view of an embodiment of the driving device.
Figure 11:
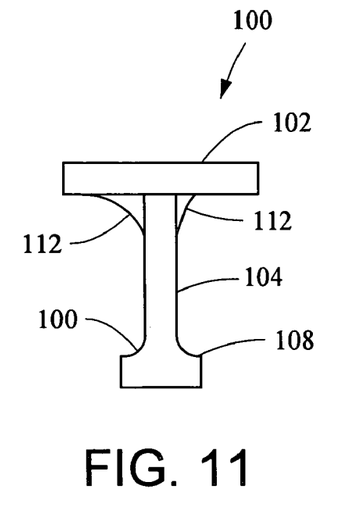
FIG. 11 illustrates a rear view of an embodiment of the driving device.

FIG. 9 illustrates a side view of an embodiment of the driving device 100, FIG. 10 illustrates a top view of an embodiment of the driving device 100, and FIG. 11 illustrates a rear view of an embodiment of the driving device 100.

Figure 12:
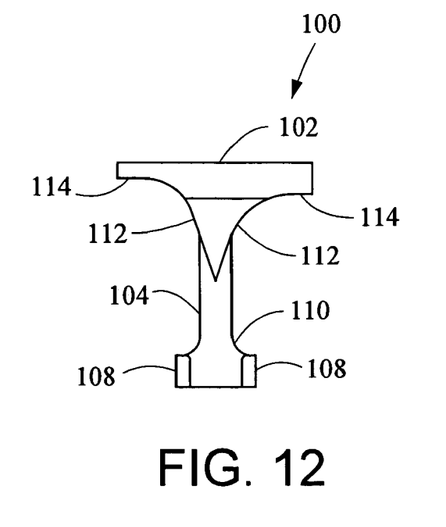
FIG. 12 illustrates a front cutaway view of an embodiment of the driving device along the line B—B of FIG. 10.

FIG. 12 illustrates a front cutaway view of an embodiment of the driving device 100 along the line B—B of FIG. 10. As shown in FIG. 12, the driving device 100 may include notches 114 that may be sized and shaped to engage the first support member 2 and the second support member 6 of the support device 10. The notches 114 may operate to provide a more stable attachment of the driving device 100 into the support device 10 during, for example, the time when the support device 10 is being driven into an object.

Figure 13:
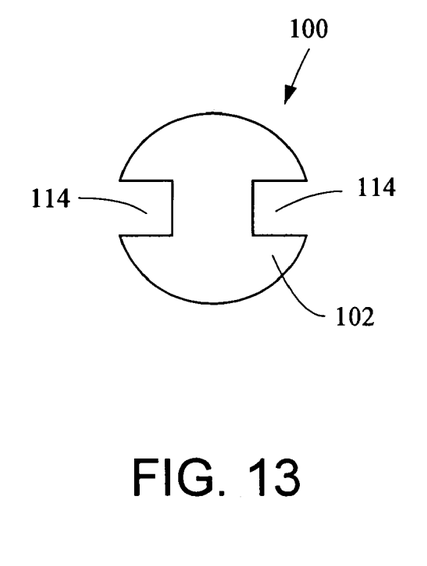
FIG. 13 illustrates a top cutaway view of an embodiment of the driving device along the line A—A of FIG. 8.
Figure 14:
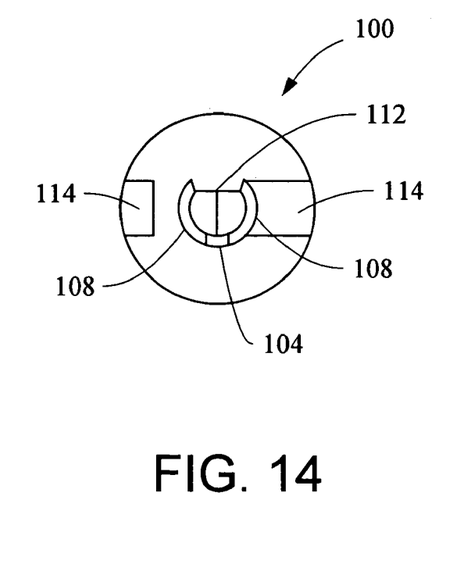
FIG. 14 illustrates a bottom view of an embodiment of the driving device.

FIG. 13 illustrates a top cutaway view of an embodiment of the driving device 100 along the line A—A of FIG. 8. FIG. 14 illustrates a bottom view of an embodiment of the driving device 100.

Although the driving device 100 is illustrated herein as having one extension portion 104, it can be understood that the driving device 100 may have multiple extension portions 104, each of which may have multiple snap portions 108.

The examples presented herein are intended to illustrate potential implementations of the present method and system embodiments. It can be appreciated that such examples are intended primarily for purposes of illustration. No particular aspect or aspects of the example method and system embodiments described herein are intended to limit the scope of the present invention. The configuration and specific functions of a particular support bracket, for example, are provided merely for convenience of disclosure.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these and other elements may be desirable. However, because such elements are well known in the art, and because they do not facilitate a better understanding of the present invention, a discussion of such elements is not provided herein.

It can be appreciated that, in some embodiments of the present methods and systems disclosed herein, a single component can be replaced by multiple components, and multiple components replaced by a single component, to perform a given function. Except where such substitution would not be operative to practice the present methods and systems, such substitution is within the scope of the present invention.

Whereas particular embodiments of the invention have been described herein for the purpose of illustrating the invention and not for the purpose of limiting the same, it can be appreciated by those of ordinary skill in the art that numerous variations of the details, materials and arrangement of parts may be made within the principle and scope of the invention without departing from the invention as described in the appended claims.

What is claimed is:

1. A support device, comprising:
   a rigid shank having a first end and a second end;
   threads disposed at the first end of the shank for use in securing the device to a pole;
   a rigid first support member disposed on the second end of the shank for securing a first object to the pole;
   a rigid second support member disposed on the second end of the shank for securing a second object to the pole, wherein the first and second rigid support members form a split portion where they meet the shank; and
   a driving device attached to the second end of the shank at the split portion and adapted to drive the support device into an object, the driving device comprising:
   a rigid driving end adapted to receive a blow from a driving tool;
   an extension portion extending from the driving end, the extension portion adapted to contact the shank of the support device; and
   a nesting portion extending from the driving end, the nesting portion adapted to engage the split portion of the support device.

2. The device of claim 1, wherein the driving device further comprises a plurality of snap portions located on a lower portion of the extension portion.

3. The device of claim 2, wherein the snap portions are formed on the lower portion of the extension portion.

4. The device of claim 2, wherein the snap portions are attached to the lower portion of the extension portion.

5. The device of claim 1, wherein the driving end includes a notch that is adapted to receive at least one of the first and second support members of the support device.

6. The device of claim 1, wherein the driving device is constructed of a metal selected from the group consisting of steel, aluminum, titanium and stainless steel.

7. The device of claim 1, wherein the driving device is removably attached to the second end of the shank.

8. The device of claim 1, wherein the driving device is fixably attached to the second end of the shank.

9. The device of claim 1, wherein the shank and the first support member form a P shape.

10. The device of claim 1, wherein the shank and the second support member for a J shape.

* * * * *